(12) United States Patent
Schmid et al.

(10) Patent No.: US 7,609,462 B2
(45) Date of Patent: Oct. 27, 2009

(54) OPTOELECTRONIC MODULE

(75) Inventors: Roland Schmid, Stuttgart (DE); Jens Schick, Herrenberg (DE)

(73) Assignee: Robert Bosch GmbH, Stuttgart (DE)

( * ) Notice: Subject to any disclaimer, the term of this patent is extended or adjusted under 35 U.S.C. 154(b) by 172 days.

(21) Appl. No.: 11/578,620

(22) PCT Filed: Mar. 4, 2005

(86) PCT No.: PCT/EP2005/050989

§ 371 (c)(1),
(2), (4) Date: Jun. 8, 2007

(87) PCT Pub. No.: WO2005/101813

PCT Pub. Date: Oct. 27, 2005

(65) Prior Publication Data

US 2007/0279770 A1    Dec. 6, 2007

(30) Foreign Application Priority Data

Apr. 15, 2004  (DE) ................. 10 2004 018 222

(51) Int. Cl.
*G02B 7/02* (2006.01)
(52) U.S. Cl. ..................... 359/811; 359/813
(58) Field of Classification Search ................. 359/811, 359/812, 813, 819, 822
See application file for complete search history.

(56) References Cited

U.S. PATENT DOCUMENTS

| | | | |
|---|---|---|---|
| 4,734,778 A | | 3/1988 | Kobayashi et al. |
| 5,212,595 A | * | 5/1993 | Dennison et al. ............. 359/513 |
| 5,789,709 A | * | 8/1998 | Luers et al. ................ 174/71 B |
| 6,359,740 B1 | * | 3/2002 | Tsuchiya ..................... 359/819 |
| 6,809,884 B2 | * | 10/2004 | Nomura et al. .............. 359/699 |
| 7,199,359 B2 | * | 4/2007 | Webster ...................... 250/239 |
| 7,242,433 B2 | * | 7/2007 | Tanaka et al. ............... 348/340 |
| 2003/0066638 A1 | * | 4/2003 | Qu et al. ...................... 165/186 |

FOREIGN PATENT DOCUMENTS

| | | |
|---|---|---|
| JP | 6-242678 | 9/1994 |
| WO | 03 005455 | 1/2003 |
| WO | 2005 015897 | 2/2005 |

* cited by examiner

*Primary Examiner*—Timothy J Thompson
(74) *Attorney, Agent, or Firm*—Kenyon & Kenyon LLP

(57) ABSTRACT

An optoelectronic module having a housing and a supporting element for optical and electronic components situated in the housing. At least one optical component is situated in the housing as well as on the supporting element. The supporting element is connected to the housing via fastening arrangements. Subsequently to assembly of the supporting element, the fastening arrangements are upset in such a way that the material of the fastening arrangement fills the recesses situated in the supporting element, thereby fixing the supporting element.

24 Claims, 1 Drawing Sheet

OPTOELECTRONIC MODULE

FIELD OF THE INVENTION

The present invention relates to an optoelectronic module.

BACKGROUND INFORMATION

Cameras having optical sensors and which are permanently attached to a vehicle are increasingly used in the automobile industry for optically detecting the vehicle's surroundings. The high demands on the alignment of optical imaging elements with regard to a light-sensitive sensor result as a rule in the use of what is known as imager modules in which the optical imaging elements are directly mounted on the light-sensitive sensor. However, this limits the processing temperature of the imager module, rendering known inexpensive soldering techniques for attaching such imager modules, e.g., on a supporting element carrying electronic and optical components, unusable.

SUMMARY OF THE INVENTION

Based on the optoelectronic module, it is possible to assemble an optical module including an imaging lens system and a light-sensitive sensor, which meets all optical requirements, without unacceptably high thermal stress due to soldering processes or the like. Due to the fact that the imaging optical element is situated in a housing and that the light-sensitive optical element is separately connected to a supporting element, it is possible to optimally pre-assemble both optical elements. In the subsequent assembly of supporting element and housing, a simple and reliable alignment of the optical axes of the optical elements is facilitated by the fact that the optical element connected to the supporting element comes to rest on a supporting surface on the housing while the supporting element, for adjustment purposes, still remains rotatable and displaceable in an x-, y-plane. Due to the fact that the optical element, connected to the supporting element, rests only loosely on the supporting surface and is not fixedly attached to the housing, an excessive mechanical stress of the soldered joints of the optical element, which is preferably soldered to the supporting element, may be prevented. This is, however, advantageous for a long service life of the optoelectronic module. Despite the stable and durable construction, the optoelectronic module may be manufactured in a cost-effective manner, which in turn benefits high-volume applications. Since the imaging optical element is assembled mechanically separated from the light-sensitive optical element, it may also be easily replaced in the event of damage. This makes the optoelectronic module repair-friendly.

DETAILED DESCRIPTION

The present invention relates to an optoelectronic module having a housing and a supporting element for optical and electronic components situated in the housing. At least one optical component is situated in the housing as well as on the supporting element. The supporting element is attached to the housing via fastening means. Subsequently to the assembly of the supporting element, the fastening means are upset in such a way that the material of the fastening means fills recesses situated in the supporting element, thereby fixing the supporting element.

Figure 1:
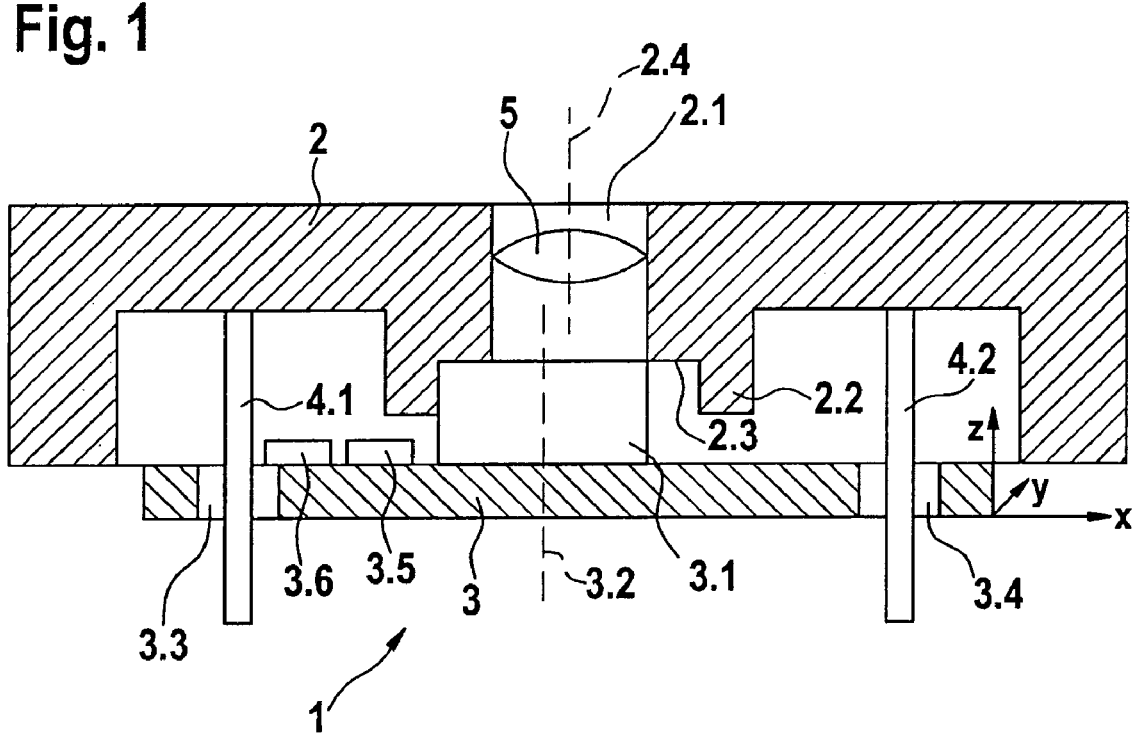
FIG. 1 schematically shows a cross section of the optoelectronic module in a first manufacturing phase.
Figure 2:
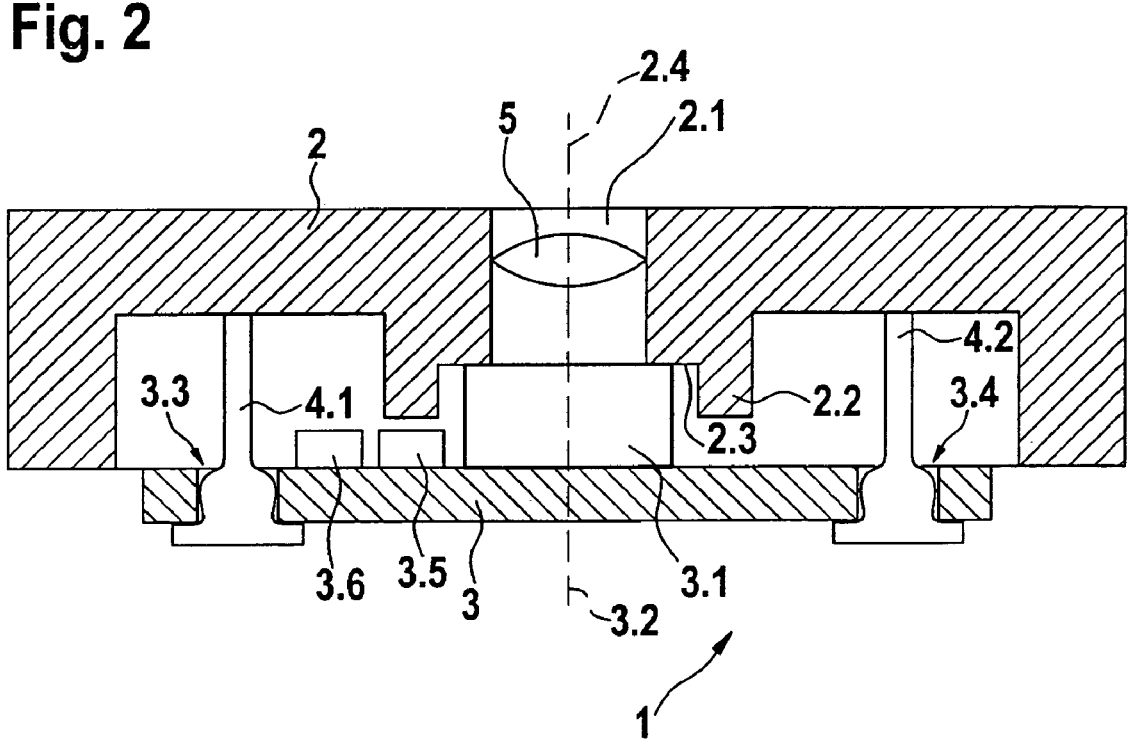
FIG. 2 schematically shows a cross section of the optoelectronic module in a second manufacturing phase.

FIG. 1 schematically shows a cross section of optoelectronic module 1 in a first manufacturing phase. Optoelectronic module 1 includes a housing 2 for accommodating a supporting element 3. An optical duct 2.1 is situated in housing 2. An optical element 5, whose optical axis is indicated by numeral 2.4, is mounted in this optical duct 2.1. Optical duct 2.1 opens into a support surface 2.3 whose edge is formed by a collar 2.2 which stands out in the axial direction. Furthermore, housing 2 includes fastening means 4.1, 4.2 for supporting element 3. Fastening means 4.1, 4.2 extend essentially parallel to optical duct 2.1. Supporting element 3 carries one optical element 3.1 and a plurality of electronic elements 3.5, 3.6. Furthermore, supporting element 3 has recesses 3.3, 3.4 whose inside width exceeds the diameter of fastening means 4.1, 4.2. Here, x, y, z indicate Cartesian coordinates. The x and y axes lie in the plane of the supporting element, while the z axis runs parallel to the surface normal of supporting element 3 and consequently also parallel to the optical axis of optical duct 2.1. During assembly of supporting element 3 in housing 2, supporting element 3 and housing 2 are initially aligned in such a way that fastening means 4.1, 4.2, connected to housing 2, reach through recesses 3.3, 3.4 in supporting element 3. Supporting element 3 is subsequently displaced in the axial direction parallel to the z axis until an exterior surface of optical element 3.1, situated on supporting element 3, rests on support surface 2.3. Due to the stop of optical element 3.1 on this support surface 2.3, its position in the z direction is essentially fixed. However, since the diameter of recesses 3.3., 3.4, situated in supporting element 3, exceeds the diameter of fastening means 4.1, 4.2, supporting element 3 together with optical element 3.1 is still displaceable and rotatable in the x, y plane. This is necessary in order to align optical elements 3.1, 5 to one another in such a way that their optical axes 2.4, 3.2 are aligned with one another. Subsequently to the exact alignment of optical elements 3.1, 5 to each other, supporting element 3 is permanently fixed in its position, by upsetting fastening means 4.1, 4.2, for example. The material of upset fastening means 4.1, 4.2 advantageously fills recesses 3.3., 3.4. This assembly state is shown in FIG. 2.

In a further design variant of the present invention, threaded studs are provided as the fastening means. Subsequently to sliding supporting element 3 onto the studs and aligning optical elements 3.1, 5 to each other, supporting element 3 is screwed together with the studs using washers and nuts. In a further embodiment of the present invention, fastening means 4.1, 4.2 are glued to the supporting element after the alignment of optical elements 3.1, 5 has taken place.

What is claimed is:

1. An optoelectronic module, comprising:
    a housing; and
    a supporting element situated in the housing and for supporting optical components and electronic components, wherein at least one of the optical components is situated in the housing and on the supporting element;
    wherein:
        the housing includes fastening elements for mounting the supporting element;
        the supporting element includes recesses that encompass the fastening elements;
        an internal diameter of the recesses is substantially greater than an external diameter of the fastening elements in order to enable an adjusting movement of the supporting element with respect to the housing; and the fastening elements are upset in such a way that a material of the fastening elements fills the recesses.

2. The optoelectronic module as recited in claim 1, wherein the optical components are adjustable with respect to one another.

3. The optoelectronic module as recited in claim 1, wherein the housing includes an optical duct for accommodating the at least one of the optical components.

4. The optoelectronic module as recited in claim 3, wherein, in one assembly stage, the supporting element is at least one of rotatable and displaceable in a radial direction with respect to the optical duct.

5. The optoelectronic module as recited in claim 3, wherein:

the optical duct opens into a support surface facing the supporting element, and the support surface serves as a stop for an optical component situated on the supporting element.

6. The optoelectronic module as recited in claim 5, further comprising:

a collar that stands out in an axial direction and forms an edge of the support surface, wherein the collar surrounds with distance the optical component situated on the supporting element.

7. The optoelectronic module as recited in claim 3, wherein at least one of the optical components is detachably mounted in the optical duct.

8. The optoelectronic module as recited in claim 3, wherein the at least one of the optical components situated in the optical duct includes an imaging optical element.

9. The optoelectronic module as recited in claim 1, wherein the at least one of the optical components connected to the supporting element includes a light-sensitive optical element.

10. The optoelectronic module as recited in claim 1, wherein the at least one of the optical components is connected to the supporting element via a soldering joint.

11. The optoelectronic module as recited in claim 1, wherein the fastening elements include one of upsettable pins, studs, and nuts.

12. An optoelectronic module, comprising:

a housing; and a supporting element situated in the housing and for supporting optical components and electronic components, wherein at least one of the optical components is situated in the housing and on the supporting element;

wherein:

the housing includes fastening elements for mounting the supporting element;

the supporting element includes recesses that encompass the fastening elements;

an internal diameter of the recesses is substantially greater than an external diameter of a portion of the fastening elements that extends to the recesses;

the fastening elements are upset in such a way that a material of the fastening elements fills the recesses;

a difference between the internal and external diameters being such that, prior to fastening elements being upset, the different enables an adjusting movement of the supporting element with respect to the housing.

13. The optoelectronic module as recited in claim 12, wherein the optical components are adjustable with respect to one another.

14. The optoelectronic module as recited in claim 12, wherein the housing includes an optical duct for accommodating the at least one of the optical components.

15. The optoelectronic module as recited in claim 14, wherein, in one assembly stage, the supporting element is at least one of rotatable and displaceable in a radial direction with respect to the optical duct.

16. The optoelectronic module as recited in claim 14, wherein:

the optical duct opens into a support surface facing the supporting element, and the support surface serves as a stop for an optical component situated on the supporting element.

17. The optoelectronic module as recited in claim 16, further comprising:

a collar that stands out in an axial direction and forms an edge of the support surface, wherein the collar surrounds with distance the optical component situated on the supporting element.

18. The optoelectronic module as recited in claim 14, wherein at least one of the optical components is detachably mounted in the optical duct.

19. The optoelectronic module as recited in claim 14, wherein the at least one of the optical components situated in the optical duct includes an imaging optical element.

20. The optoelectronic module as recited in claim 12, wherein the at least one of the optical components connected to the supporting element includes a light-sensitive optical element.

21. The optoelectronic module as recited in claim 12, wherein the at least one of the optical components is connected to the supporting element via a soldering joint.

22. The optoelectronic module as recited in claim 12, wherein the fastening elements include one of upsettable pins, studs, and nuts.

23. A method for constructing an optoelectronic module, comprising:

placing fastening elements in a housing;

mounting, in the housing and to the fastening elements, a supporting element for supporting optical components and electrical components, the supporting element including recesses that encompass the fastening elements and that have an internal diameter substantially greater than an external diameter of the fastening elements such that an adjusting movement of the supporting element with respect to the housing is enabled;

situating at least one of the optical components in the housing and on the supporting element; and upsetting the fastening elements in such a way that a material of the fastening elements fills the recesses.

24. The method as recited in claim 23, wherein the fastening elements include one of upsettable pins, studs, and nuts.

* * * * *

UNITED STATES PATENT AND TRADEMARK OFFICE
CERTIFICATE OF CORRECTION

PATENT NO. : 7,609,462 B2  
APPLICATION NO. : 11/578620  
DATED : October 27, 2009  
INVENTOR(S) : Schmid et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 183 days.

Signed and Sealed this

Twelfth Day of October, 2010

David J. Kappos  
*Director of the United States Patent and Trademark Office*